United States Patent [19]

Koyama et al.

[11] Patent Number: 5,133,025
[45] Date of Patent: Jul. 21, 1992

[54] SCANNING APPARATUS FOR READING AN IMAGE

[75] Inventors: Noboru Koyama, Kanagawa; Kiyosuke Suzuki, Saitama, both of Japan

[73] Assignee: Sony Corporation, Tokyo, Japan

[21] Appl. No.: 412,432

[22] Filed: Sep. 26, 1989

[30] Foreign Application Priority Data

Sep. 29, 1988 [JP] Japan ................................. 63-245510

[51] Int. Cl.$^5$ ............................................. G06K 9/00
[52] U.S. Cl. ...................................... 382/46; 340/727; 340/731; 358/451; 382/47
[58] Field of Search .................... 382/58, 59, 67, 46, 382/47; 340/727, 731; 358/451

[56] References Cited

U.S. PATENT DOCUMENTS

| 3,976,982 | 8/1976 | Eiselen | 382/46 |
| 4,453,268 | 6/1984 | Britt | 382/67 |
| 4,819,190 | 4/1989 | Hinman et al. | 382/47 |
| 4,903,315 | 2/1990 | Peppers et al. | 382/47 |
| 4,912,771 | 3/1990 | Komine et al. | 382/46 |
| 4,916,747 | 4/1990 | Arimoto | 382/47 |

FOREIGN PATENT DOCUMENTS

0016299 10/1980 European Pat. Off. .
0327112 8/1989 European Pat. Off. .

OTHER PUBLICATIONS

A High-Resolution, High-Speed Film Scanner System Using Optical Butted Charge-Coupled-Devices by Richard A. Whittlesey, pp. 156-165.

Primary Examiner—Leo H. Boudreau
Attorney, Agent or Firm—Hill, Van Santen, Steadman & Simpson

[57] ABSTRACT

A scanning apparatus for reading an image having a line sensor composed by positioning a plurality of sensing devices in line for reading an image of a document, a motor for moving the line sensor and the document relatively, the motor making a motion to move the line sensor at a right angle with a direction of an arrangement of the sensing devices, an analog-to-digital (A/D) converter for converting a first anaglog image signal output from the line sensor to a first digital image signal, a memory for storing the first digital image signal, a memory controller for generating a write signal to the memory and for appointing an address at which the first digital image signal is written in the memory according to each writing mode, each writing mode being used to determine a sequence to appoint the address, a selecting circuit for selecting the writing mode by controlling the memory controller, and a digital-to-analog (D/A) converter for converting a second digital image signal output from the memory to a second analog image signal.

7 Claims, 4 Drawing Sheets

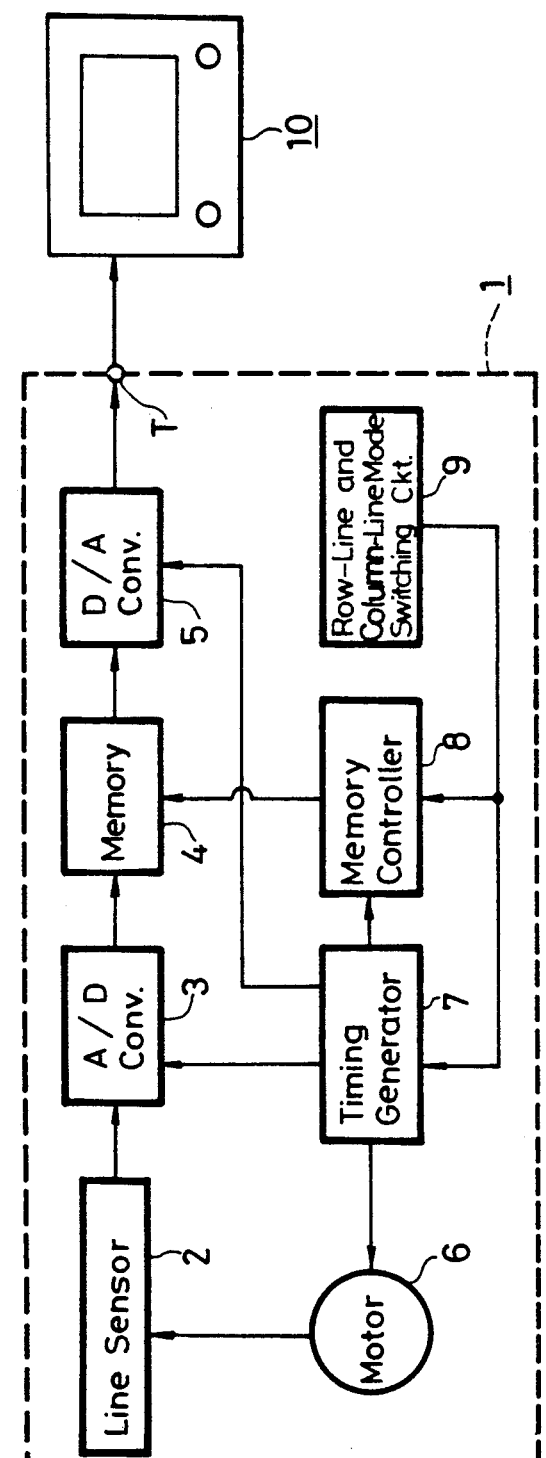
FIG. 2
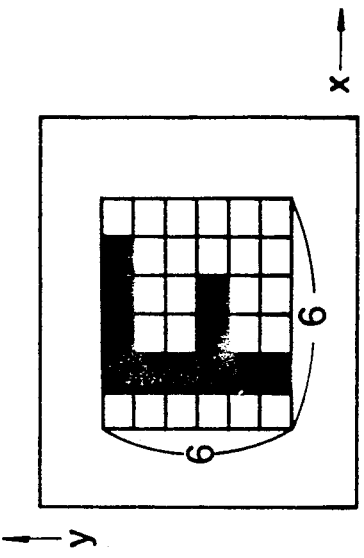
FIG. 5
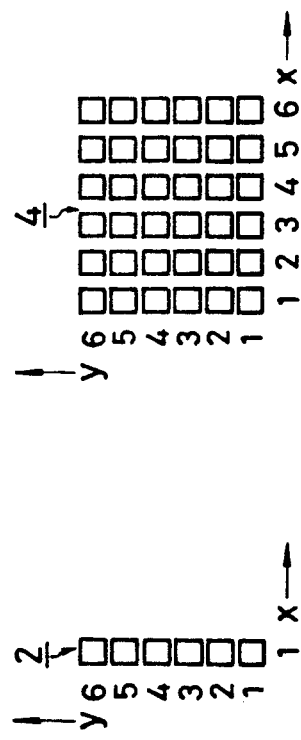
FIG. 4
FIG. 3

SCANNING APPARATUS FOR READING AN IMAGE

BACKGROUND OF THE INVENTION

1. Field of the Invention

The present invention relates generally to image scanners and, more particularly, is directed to a scanning apparatus for reading an image in which an image can be displayed in various modes such as location, size and the combination thereof without using a memory of large storage capacity or a data processing apparatus such as a computer.

2. Description of the Prior Art

In a prior-art scanning apparatus using a line sensor to read a two-dimensional image, the line sensor is moved relative to a rectangular, standardized document on which a two-dimensional image is printed along the longitudinal direction of the document to scan the same, whereby line sensor generates a two-dimensional image signal formed of successive line image signals.

The two-dimensional image read out from the rectangular document by the prior-art image scanning apparatus is temporarily stored in a memory of large capacity (mass storage memory) in a processing apparatus such as a computer or the like. When the two-dimensional image is reproduced by a monitor receiver connected to the image scanning apparatus through the computer or the like, the long and short sides of the rectangular document should become respectively coincident with those of the picture screen of the monitor receiver because the picture screen of the monitor receiver is rectangular in shape.

More specifically, when the line sensor scans the document along the lateral direction thereof, if one line of short side of the image data is stored in the memory at its storage area of one column line direction, the image data of one column line from the memory is displayed so as to become identical with the short side of the picture screen (see FIG. 1A).

However, if the document whose short sides are directed to the up and down direction is scanned by the line sensor and the image data is displayed similary as described above, a picture is displayed such that it is turned laterally, which makes the image displayed be very difficult to see (see FIG. 1B).

In order to solve the above-mentioned problem, one column line data stored in the memory is converted by a coordinate converter or the like so as to correspond to the lateral direction of the picture screen of the monitor receiver according to the control of the processing apparatus such as the computer or the like (see FIG. 1C). As described above, the prior-art scanning apparatus has a function only for reading an image so that, when it processes an image, it can not process the image without the computer and the mass-storage memory, which provides an expensive overall system.

OBJECTS AND SUMMARY OF THE INVENTION

Accordingly, it is an object of the present invention to provide an improved scanning apparatus for reading an image which can eliminate the defects encountered with the prior art.

It is another object of the present invention to provide a scanning apparatus for reading an image in which without using a memory of large storage capacity, a data processing apparatus such as a computer and the like, the modes in which the two-dimensional image of the two-dimensional image signal formed of the line image signals sequentially read by the line sensor is located can be changed with ease.

According to an aspect of the present invention, there is provided a scanning apparatus for reading an image comprising:

(a) a line sensor composed by positioning a plurality of sensing devices in line for reading an image of a document;

(b) driving means for moving said line sensor and said document relatively, said driving means making a motion to move said line sensor at a right angle with a direction of an arrangement of said sensing devices;

(c) an analog-to-digital (A/D) converter for converting a first analog image signal output from said line sensor to a first digital image signal;

(d) memory means for storing said first digital image signal;

(e) a memory controller for generating a write signal to said memory means and for appointing an address at which said first digital image signal is written in said memory means according to each writing mode, said each writing mode being used to determine a sequence to appoint said address;

(f) selecting means for selecting said writing mode by controlling said memory controller; and (g) a digital-to-analog (D/A) converter for converting a second digital image signal output from said memory means to a second analog image signal.

These and other objects, features and advantages of the present invention will be apparent in the following detailed description of a preferred embodiment when read in conjunction with the accompanying drawings, in which like reference numerals are used to identify the same or similar parts in the several views.

BRIEF DESCRIPTION OF THE DRAWINGS

FIG. 2 is a block diagram showing a scanning apparatus for reading an image according to an embodiment of the present invention;

FIG. 3 is a schematic representation of a line sensor used in the present invention;

FIG. 4 is a schematic representation of a memory used in the present invention;

FIG. 5 is a schematic representation of a document to be scanned by the present invention;

DETAILED DESCRIPTION OF A PREFERRED EMBODIMENT

Figure 1A:
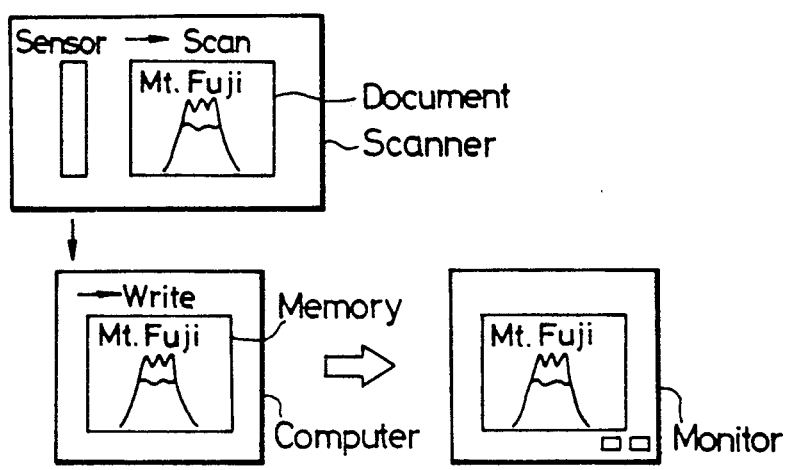
FIGS. 1A–1C are schematic views to which reference will be made in explaining operation of a prior-art scanning apparatus for reading an image.
Figure 1B:
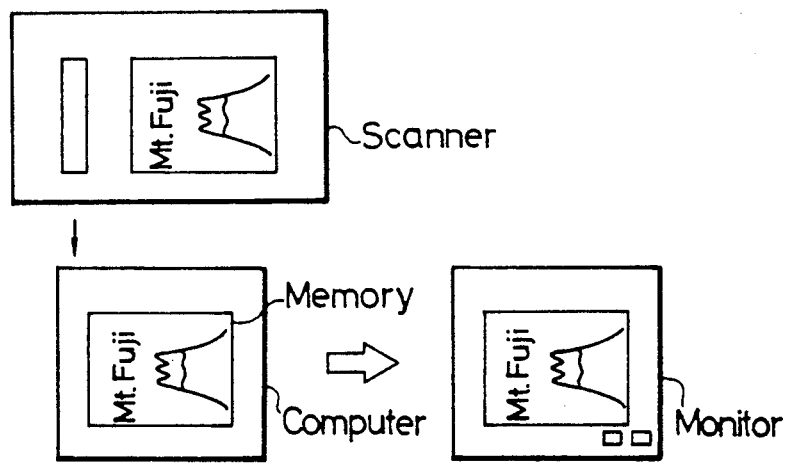
Figure 1C:
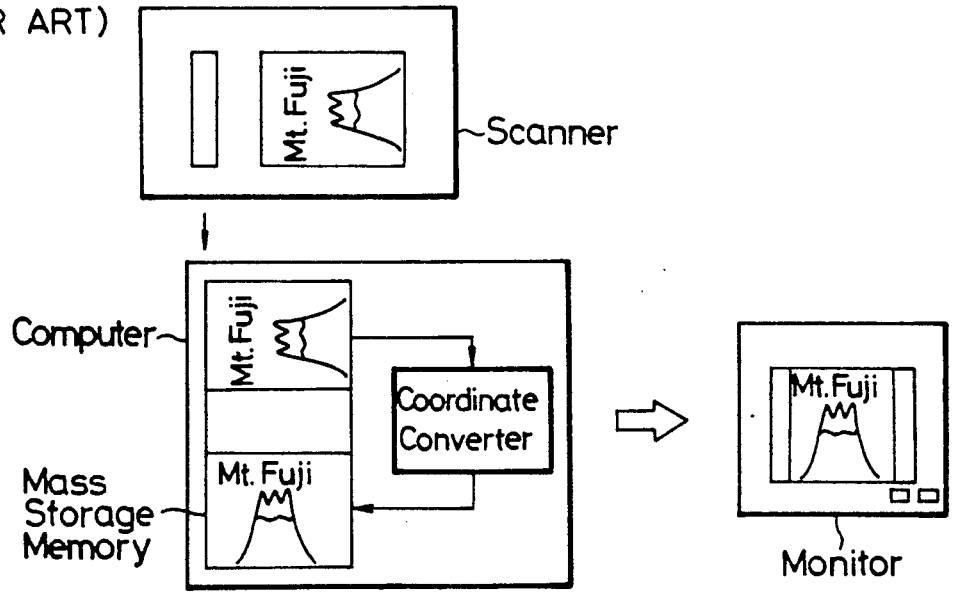

A scanning apparatus for reading an image according to an embodiment of the present invention will hereinafter be described with reference to the drawings.

FIG. 2 is a block diagram showing an embodiment of the present invention in which reference numeral 1 generally designates a scanning apparatus for reading an image and 10 a monitor receiver connected to the scanning apparatus 1.

In the scanning apparatus 1, there is provided a line sensor 2 which is what might be called a charge-coupled device (CCD) or the like. The line sensor 2 is driven by a motor 6 so that it moves in the direction perpendicular to the longitudinal direction thereof.

The line sensor 2 generates a line image signal as a sequence signal or a simultaneous signal of a picture element signal. This line image signal is supplied to an analog-to-digital (A/D) converter 3, in which it is converted to a digital line image signal. The sequence signal of the line image signal from the line sensor 2 forms a two-dimensional image signal, accordingly, the sequence signal of the digital line image signal from the A/D converter 3 forms a digital two-dimensional image signal. The A/D converter 3 is supplied with a clock signal from a timing generator 7.

The digital two-dimensional image signal formed of the sequence signal of the digital line image signal from the A/D converter 3 is written in a two-dimension memory 4 and stored therein. The memory 4 is supplied with a write and read control signal from a memory controller 8 and is thereby controlled in its write and read operation. The memory controller 8 includes an address control circuit (not shown) which appoints addresses upon reading and writing the image signal from the memory 4. The address signal from the address control circuit is supplied to the memory 4. The memory controller 8 is supplied with write and read clock signals from the timing generator 7 and its address control circuit generates write and read address signals on the basis of the write and read clock signals.

The digital two-dimensional image signal formed of the sequence signal of the digital image signal read from the memory 4 is supplied to a digital-to-analog converter 5, in which it is converted to an analog two-dimensional image signal. The analog-two-dimensional signal from the D/A converter 5 is supplied through a terminal T to the monitor receiver 10 provided outside of the scanning apparatus 1. The D/A converter 5 is supplied with the clock signal from the timing generator 7.

A row-line and column-line mode switching circuit 9 generates a switching signal. This switching signal is supplied to the timing generator 7 and to the memory controller 8, whereby the write address in which the line image signal from the line sensor 2 is written in the two-dimension memory 4 is switched as will be described later.

The operation of the embodiment of the scanning apparatus according to this invention will be described with reference to FIGS. 3 to 6. In the following explanation, the digital image signal is a binary signal for simplicity and the digital image signal is not limited to the binary signal but may be a multilevel signal such as an 8-bit signal or the like.

The line sensor 2 is shown in FIG. 3, and we assume that the line sensor 2 be formed of 6 pixel sensor portions in order to gain a better understanding of the present invention. As shown in FIG. 3, the 6 pixel sensor portions are aligned in the y direction of the xy orthogonal coordinate system and the 6 pixel sensor portions are represented by xy coordinates (1, 1), (1, 2), . . . , (1, 6), respectively.

The memory 4 is shown in FIG. 4, and we assume that the memory 4 be formed of 6×6 pixel storing portions in order to gain a better understanding of the present invention and in order to correspond to the line sensor 2. As shown in FIG. 4, the 6×6 pixel storing portions are represented by xy coordinates (1, 1), . . . , (6, 6), respectively.

FIG. 5 shows a document, and we assume that the document be formed of 6×6 pixels which form a two-dimensional image whose configuraton is square in order to gain a better understanding of the present invention and in order to correspond to the line sensor 2 and the memory 4. This two-dimensional image includes a character [F] which is placed correctly as shown in FIG. 5.

FIGS. 6A-6L show conditions which respective pixel storing portions store the digital image signals, respectively. Throughout FIGS. 6A-6L, a hatched square portion represents a portion in which a digital image signal is not yet stored, an open square portion represents a portion in which a digital image signal [0] corresponding to white is stored, and a solid square portion represents a portion in which a digital image signal [1] corresponding to black is stored, respectively.

Operation which the scanning apparatus makes when the row-line and column-line mode switching circuit 9 is switched to the row-line mode will be described hereinafter. In this case, let us assume that the line sensor 2 scans the two-dimensional image on the document in the x direction, i.e. from left to right in FIG. 5.

Figure 6A:
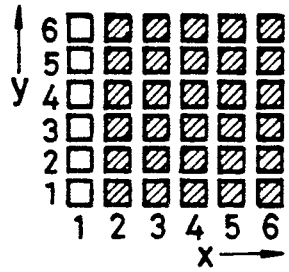
FIGS. 6A–6L are schematic representations of storage portions of the memory to which reference will be made in explaining the operation of the present invention, respectively.

When the line sensor 2 scans 6 pixels on the first column from the left of the picture shown in FIG. 5, then the line image signals from the line sensor 2 are converted to the digital line image signals by the A/D converter 3, and are respectively written in the memory 4 at its pixel storing portions designated by addresses (1, 1) to (1, 6) as shown in FIG. 6A.

Figure 6G:
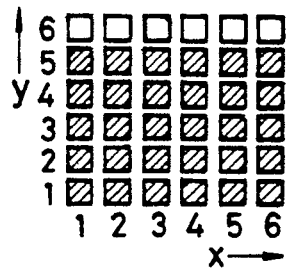
Figure 6B:
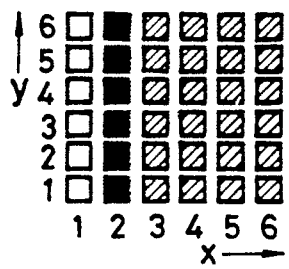

When the line sensor 2 scans 6 pixels on the second column from the left of the picture shown in FIG. 5, then the line image signals from the line sensor 2 are converted to the digital line image signals by the A/D converter 3, and are respectively written in the memory 4 at its pixel storing portions designated by addresses (2, 1) to (2, 6) as shown in FIG. 6B.

Figure 6H:
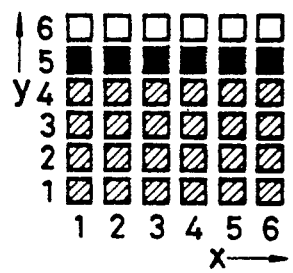
Figure 6C:
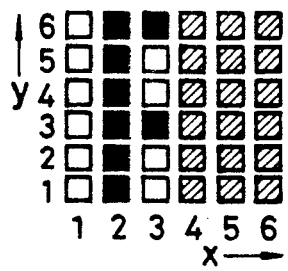

When the line sensor 2 scans 6 pixels on the third column from the left of the picture shown in FIG. 5, then the line image signals from the line sensor 2 are converted to the digital line image signals by the A/D converter 3, and are respectively written in the memory 4 at its pixel storing portions designated by addresses (3, 1) to (3, 6) as shown in FIG. 6C.

Figure 6I:
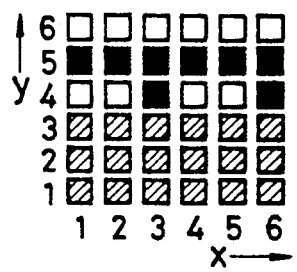
Figure 6D:
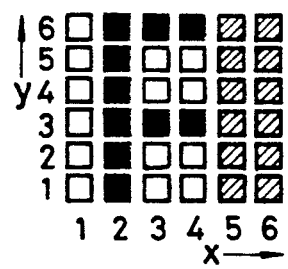

When the line sensor 2 scans 6 pixels on the fourth column from the left of the picture shown in FIG. 5, then the line image signals from the line sensor 2 are converted to the digital line image signals by the A/D converter 3, and are respectively written in the memory 4 at its pixel storing portions designated by addresses (4, 1) to (4, 6) as shown in FIG. 6D.

Figure 6J:
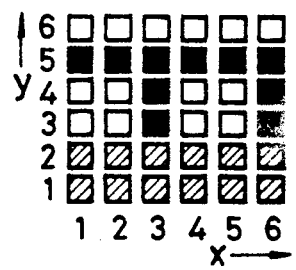
Figure 6E:
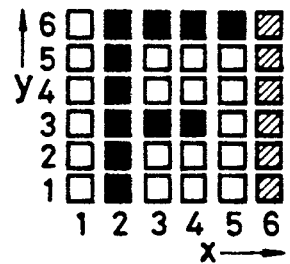

When the line sensor 2 scans 6 pixels on the fifth column from the left of the picture shown in FIG. 5, then the line image signals from the line sensor 2 are converted to the digital line image signals by the A/D converter 3, and are respectively written in the memory 4 at its pixel storing portions designated by addresses (5, 1) to (5, 6) as shown in FIG. 6E.

Figure 6K:
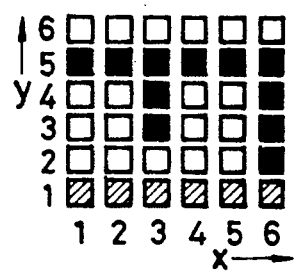
Figure 6F:
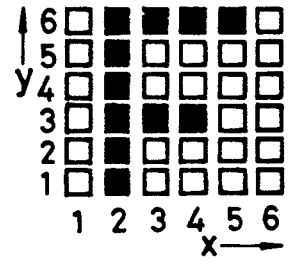

When the line sensor 2 scans 6 pixels on the sixth column from the left of the picture shown in FIG. 5, then the line image signals from the line sensor 2 are converted to the digital line image signals by the A/D converter 3, and are respectively stored in the memory 4 at its pixel storing portions designated by addresses (6, 1) to (6, 6) as shown in FIG. 6F.

Thus, when the digital image signals stored in the pixel storing portions of the memory 4 are sequentially read out in the order of addresses (1, 6), (2, 6), ..., (6, 6), (1, 5), ..., (6, 5), (1, 4), (2, 4), ..., (6, 4), ..., (1, 1), (2, 1), ..., (6, 1), converted to analog pixel signals by the D/A converter 5 and are fed to the monitor receiver 10, then a two-dimensional picture including the character [F], directed correctly, is displayed on the display screen of the monitor receiver 10.

The operation which the scanning apparatus of the invention makes when the row-line and column-line mode switching circuit 9 is switched to the column-line mode will be described next. In this case, let us assume that the line sensor 2 scan the two-dimensional image of the document from left to right in the x direction shown in FIG. 5.

When the line sensor 2 scans 6 pixels on the first column from the left of the picture, then the line image signals from the line sensor 2 are converted to the digital line image signals by the A/D converter 3, and are respectively written in the memory 4 at its pixel storing portions designated by addresses (1, 6) to (6, 6) as shown in FIG. 6G.

When the line sensor 2 scans 6 pixels on the second column from the left of the picture, then the line image signals from the line sensor 2 are converted to the digital line image signals by the A/D converter 3 and are respectively written in the memory 4 at its pixel storing portions designated by addresses (1, 5) to (6, 5) as shown in FIG. 6H.

When the line sensor 2 scans 6 pixels on the third column from the left of the picture, then the line image signals from the line sensor 2 are converted to the digital line signals by the A/D converter 3 and are respectively written in the memory 4 at its pixel storing portions designated by addresses (1, 4) to (6, 4) as shown in FIG. 6I.

When the line sensor 2 scans 6 pixels on the fourth column from the left of the picture, then the line image signals from the line sensor 2 are converted to the digital line signals by the A/D converter 3 and are respectively written in the memory 4 at its pixel storing portions designated by addresses (1, 3) to (6, 3) as shown in FIG. 6J.

When the line sensor 2 scans 6 pixels on the fifth column from the left of the picture, then the line image signals from the line sensor 2 are converted to the digital line signals by the A/D converter 3 and are respectively written in the memory 4 at its pixel storing portions designated by addresses (1, 2) to (6, 2) as shown in FIG. 6K.

Figure 6L:
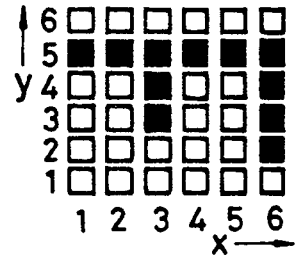

When the line sensor 2 scans 6 pixels on the sixth column from the left of the picture, then the line image signals from the line sensor 2 are converted to the digital line signals by the A/D converter 3 and are respectively written in the memory 4 at its pixel storing portions designated by addresses (1, 1) to (6, 1) as shown in FIG. 6L.

Thus, when the digital pixel signals of the respective pixel storing portions of the memory 4 are sequentially read out in the order of (1, 6), (2, 6), ..., (6, 6), (1, 5), ..., (6, 5), (1, 4), (2, 4), ..., (6, 4), ..., (1, 1), (2, 1), ..., (6, 1), fed to the D/A converter 5, in which they are converted to the analog pixel signals and then are fed to the monitor receiver 10, a two-dimensional picture including a character [F1] which is rotated by 90 degrees in the clockwise direction, is displayed on the picture screen of the monitor receiver 10.

In the above-mentioned embodiment, when the digitized signals of the line image signal from the line sensor 2 are written in the 6 vertically-aligned pixel storing portions of the two-dimension memory 4 from left to right in FIG. 6 or when the digitized signals are written in the memory 4 at its 6 horizontally-aligned pixel storing portions from top to bottom in FIG. 6, the two-dimensional image of the two-dimensional image signal read out of the document can be selectively arranged in the same direction or it can be rotated by 90 degrees. The two-dimensional image of the two-dimensional image signal gained by scanning the document can be selectively displayed in the original condition or in the condition rotated by 180 degrees by writing the digitized signal of the line image signal from the line sensor 2 in the two-dimension memory 4 at its 6 vertically-aligned pixel storing portions from either left to right or from right to left in FIG. 6. Further, by the combination of the above-mentioned manners, the two-dimensional image of the two-dimensional image signal obtained by scanning the document can be selectively displayed in the original condition, in the condition rotated by 90 degrees or in the condition rotated by 180 degrees.

Figure 7A:
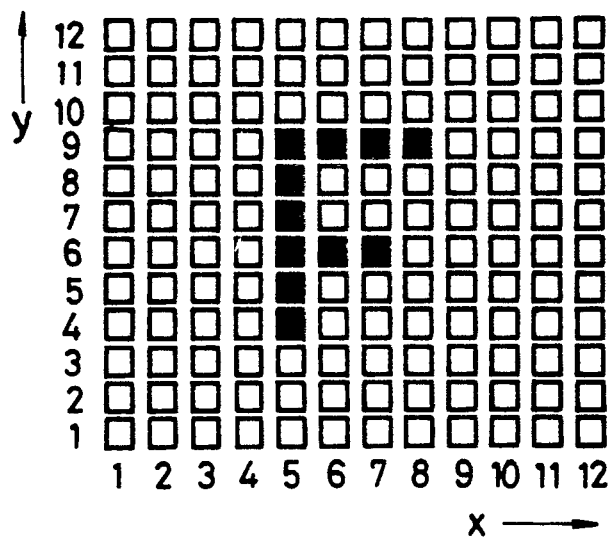
FIGS. 7A and 7B are schematic representations of storage portions of the memory to which reference will be made in explaining the operation of the apparatus of the present invention in the magnifying mode and the reducing mode, respectively.
Figure 7B:
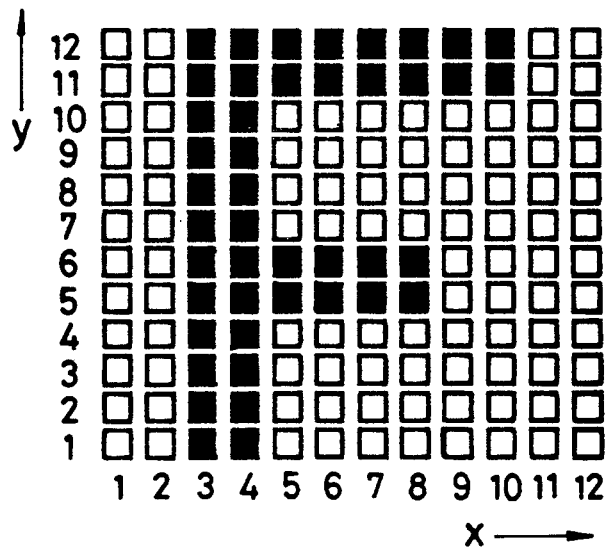

Let us explain a magnifying mode and a reducing mode in which the two-dimensional image signal, obtained by scanning the document, is magnified or reduced in size with reference to FIGS. 7A and 7B.

The magnifying mode will be explained first. In order to gain a better understanding of the magnifying mode, the pixel storing portion of the memory 4 are formed of 12×12 but the line sensor 2 is formed of 6 pixel sensor portions. In this case, the two-dimensional image on the document is formed of 6×6 pixels similary to FIG. 5.

FIGS. 7A and 7B show the condition in which image data are stored in the memory 4. Of 12×12 pixel storing portions in the memory 4, the central 6×6 pixel storing portions represented by xy coordinates (4, 4) to (9, 9) are used as normal storage areas, wherein in the normal mode (magnify-by-one mode) the digitized signals of the line image signals from the line sensor 2 are stored in the normal storage areas by the operations similar to those in the above-mentioned embodiment as shown in FIG. 7A. Further, the whole of 12×12 pixel storage portions of the memory 4 is used as a magnifying storage area, whereby in the magnifying (magnify-by-two) mode the digitized signals of the line image signals formed of 6 pixel signals from the line sensor 2 are sequentially written in two columns of pixel storage portions (24 pixel storage portions in total) in the vertical direction of the memory 4 from left to right. Thus, when the line sensor 2 scans the document having the two-dimensional image, the memory 4 stores a two-dimensional image signal which is magnified twice in the vertical and horizontal directions as shown in FIG. 7B.

The reducing mode will be explained hereinbelow. Also in this case, in order to gain a better understanding of the reducing mode, the memory 4 is comprised of 12×12 pixel storage portions, and in correspondence therewith, the line sensor 2 is comprised of 12 pixel sensor portions. In this event, the two-dimensional picture of the document is formed of 12×12 pixels. The whole of the 12×12 pixel storage portions of the memory 4 is used as a normal storage area, whereby in the normal mode (magnify-by-one mode) the digitized signals of the line image signal derived from the line sensor 2 are written in the normal storage area by the operations similar to those in the above-noted embodiment as shown in FIG. 7B. Further, of the 12×12 pixel storage areas of the memory 4, central 6×6 pixel storage portions, represented by xy coordinates (4, 4) to (9, 9) are used as reducing storage areas, wherein in the reducing mode (reduce- by-½) the line image signals, formed of every other pixel signal of the digitized signals of the line image signal formed of 12 pixel signals derived from the line sensor 2 are sequentially written in every other line address of 6 pixel storage portions of the reducing storage area of the memory 4 from left to right. Thus, when the line sensor 2 scans the document having the same two-dimensional image as that of FIG. 7B, then a two-dimensional image, which is reduced by ½ in size in the horizontal and vertical directions, is stored in the memory 4 as shown in FIG. 7A.

By the combination of the magnifying mode and the reducing mode with the above-noted embodiment, it is possible to change the displayed position and condition of the two-dimensional image of the two-dimensional image signal in five ways.

The magnifying ratio and the reducing ratio are not limited to those as described above and ma be selected freely.

Although the present invention is particularly suitable for application to the above image scanning apparatus in which the line sensor scans the rectangular, standardized document along the longitudinal direction thereof and the line sensor outputs the two-dimensional image signal composed of successive line image signals, the present invention is not limited to the above-noted apparatus and can be advantageous in a wide variety of application fields.

While the line sensor is moved so as to scan the document in the above-mentioned embodiment, it might be possible that a document on a document holder is moved relatively to the line sensor.

According to the present invention, as set out above, it is possible to obtain an apparatus for reading an image in which without using a memory of large capacity and a processing apparatus such as a computer and the like, the modes in which the two-dimensional image of the two-dimensional image signal formed of the line image signals sequentially read by the line sensor is located can be changed with ease.

Having described a preferred embodiment of the invention in detail with reference to the accompanying drawings, it is to be understood that the present invention is not limited to that precise embodiment and that many changes and modifications can be effected by one skilled in the art without departing from the spirit and scope of the invention as defined by the appended claims.

We claim as our invention:

1. A scanning apparatus for reading an image comprising:
   (a) a line sensor composed by positioning a plurality of sensing devices in line for reading an image of a document; said image comprising plural pixels arranged in a line;
   (b) driving means for moving said line sensor and said document relatively, said driving means making a motion to move said line sensor at a right angle relative to said line;
   (c) an analog-to-digital (A/D) converter for converting a first analog image signal output from said line sensor to a first digital image signal comprising plural bits;
   (d) memory means having a capacity equal to a single image for storing said first digital image signal, said memory means having plural write modes representing rotated versions of said image;
   (e) a memory controller for generating a write signal to said memory means and for appointing an address at which said first digital image signal is written directly into said memory means according to each writing mode of said plural modes, each writing mode being used to determine a sequence to appoint said address;
   (f) selecting means for selecting said writing mode by controlling said memory controller;
   (g) a digital-to-analog (D/A) converter for converting a second digital image signal output from said memory means to a second analog image signal;
   (h) a timing generator for generating a timing signal for said analog-to-digital converter and for said memory controller;
   (i) said memory controller generates a reading signal when said memory controller appoints an address for reading said second digital image signal from said memory means;
   (j) said address for reading is composed of row address and column address, said row address corresponding to a row line of a displayed picture, while said column address being corresponding to a column line thereof; and
   (h) a terminal connected to receive said second analog image signal, whereby said image may be displayed on an external monitor connected thereto.

2. A scanning apparatus for reading an image comprising:
   (a) a line sensor composed by positioning a plurality of sensing devices in line for reading an image of a document; said image comprising plural pixels arranged in a line;
   (b) driving means for moving said line sensor and said document relatively, said driving means making a motion to move said line sensor at a right angle relative to said line;
   (c) an analog-to-digital (A/D) converter for converting a first analog image signal output from said line sensor to a first digital image signal comprising plural bits;
   (d) memory means having a capacity equal to a single image for storing said first digital image signal, said memory means having plural write modes representing rotated versions of said image;
   (e) a memory controller for generating a write signal to said memory means and for appointing an address at which said first digital image signal is written directly into said memory means according to each writing mode of said plural modes, each writing mode being used to determine a sequence to appoint said address;
   (f) selecting means for selecting said writing mode by controlling said memory controller;
   (g) a digital-to-analog (D/A) converter for converting a second digital image signal output from said memory means to a second analog image signal;
   (h) a timing generator for generating a timing signal for said analog-to-digital converter and for said memory controller;
   (i) said memory controller generates a first writing signal when said selecting means selects a first writing mode, and a line image signal read by said line sensor is stored in a column line address of said memory means in said first writing mode; and (j) a terminal connected to receive said second analog image signal, whereby said image may be displayed on an external monitor connected thereto.

3. A scanning apparatus for reading an image comprising:
   (a) a line sensor composed by positioning a plurality of sensing devices in line for reading an image of a document; said image comprising plural pixels arranged in a line;
   (b) driving means for moving said line sensor and said document relatively, said driving means making a motion to move said line sensor at a right angle relative to said line;
   (c) an analog-to-digital (A/D) converter for converting a first analog image signal output from said line sensor to a first digital image signal comprising plural bits;
   (d) memory means having a capacity equal to a single image for storing said first digital image signal, said memory means having plural write modes representing rotated versions of said image;
   (e) a memory controller for generating a write signal to said memory means and for appointing an address at which said first digital image signal is written directly into said memory means according to each writing mode of said plural modes, each writing mode being used to determine a sequence to appoint said address;
   (f) selecting means for selecting said writing mode by controlling said memory controller;
   (g) a digital-to-analog (D/A) converter for converting a second digital image signal output from said memory means to a second analog image signal;
   (h) a timing generator for generating a timing signal for said analog-to-digital converter and for said memory controller;
   (i) said memory controller generates a second writing signal when said selecting means selects a second writing mode, and a line image signal read by said line sensor is stored in a row line address of said memory means in said first writing mode; and
   (j) a terminal connected to receive said second analog image signal, whereby said image may be displayed on an external monitor connected thereto.

4. A scanning apparatus for reading an image comprising:
   (a) a line sensor composed by positioning a plurality of sensing devices in line for reading an image of a document; said image comprising plural pixels arranged in a line;
   (b) driving means for moving said line sensor and said document relatively, said driving means making a motion to move said line sensor at a right angle relative to said line;
   (c) an analog-to-digital (A/D) converter for converting a first analog image signal output from said line sensor to a first digital image signal comprising plural bits;
   (d) memory means having a capacity equal to a single image for storing said first digital image signal, said memory means having plural write modes representing rotated versions of said image;
   (e) a memory controller for generating a write signal to said memory means and for appointing an address at which said first digital image signal is written directly into said memory means according to each writing mode of said plural modes, each writing mode being used to determine a sequence to appoint said address;
   (f) selecting means for selecting said writing mode by controlling said memory controller;
   (g) a digital-to-analog (D/A) converter for converting a second digital image signal output from said memory means to a second analog image signal;
   (h) a timing generator for generating a timing signal for said analog-to-digital converter and for said memory controller;
   (i) said memory controller generates a third writing signal when said selecting means selects a magnifying mode, and a line image signal read by said line sensor is stored in two line addresses of said memory means in said first writing mode; and
   (j) a terminal connected to receive said second analog image signal, whereby said image may be displayed on an external monitor connected thereto.

5. A scanning apparatus for reading an image comprising:
   (a) a line sensor composed by positioning a plurality of sensing devices in line for reading an image of a document; said image comprising plural pixels arranged in a line;
   (b) driving means for moving said line sensor and said document relatively, said driving means making a motion to move said line sensor at a right angle relative to said line;
   (c) an analog-to-digital (A/D) converter for converting a first analog image signal output from said line sensor to a first digital image signal comprising plural bits;
   (d) memory means having a capacity equal to a single image for storing said first digital image signal, said memory means having plural write modes representing rotated versions of said image;
   (e) a memory controller for generating a write signal to said memory means and for appointing an address at which said first digital image signal is written directly into said memory means according to each writing mode of said plural modes, each writing mode being used to determine a sequence to appoint said address;
   (f) selecting means for selecting said writing mode by controlling said memory controller;
   (g) a digital-to-analog (D/A) converter for converting a second digital image signal output from said memory means to a second analog image signal;
   (h) a timing generator for generating a timing signal for said analog-to-digital converter and for said memory controller;
   (i) said memory controller generates a fourth writing signal when said selecting means selects a reducing mode, and a line image signal read by said line sensor is stored in every other line address of said memory means in said first writing mode; and
   (j) a terminal connected to receive said second analog image signal, whereby said image may be displayed on an external monitor connected thereto.

6. A scanning apparatus for reading an image according to any of the preceding claims, further comprising an output plug for transmitting said second analog image signal to a monitor system connected to said scanning apparatus as a peripheral apparatus.

7. A scanning apparatus for reading an image according to any of the preceding claims, further comprising a timing generator for supplying a clock to said memory controller so that said memory controller controls a writing or reading motion to said memory means on the basis of said clock.

* * * * *